US012682557B2

(12) United States Patent
Kocsis et al.

(10) Patent No.: US 12,682,557 B2
(45) Date of Patent: Jul. 14, 2026

---

(54) SCENE RE-LIGHTING USING DIRECT SHADING CONTROL

(71) Applicant: ADOBE INC., San Jose, CA (US)

(72) Inventors: Peter Koppany Kocsis, Josef-Zauser-Weg (DE); Yannick Hold-Geoffroy, Quebec City (CA); Julien Olivier Victor Philip, London (GB); Kalyan K Sunkavalli, Saratoga, CA (US)

(73) Assignee: ADOBE INC., San Jose, CA (US)

( * ) Notice: Subject to any disclaimer, the term of this patent is extended or adjusted under 35 U.S.C. 154(b) by 225 days.

(21) Appl. No.: 18/601,435

(22) Filed: Mar. 11, 2024

(65) Prior Publication Data

US 2025/0285370 A1      Sep. 11, 2025

(51) Int. Cl.
| | |
|---|---|
| *G06T 15/80* | (2011.01) |
| *G06T 7/50* | (2017.01) |
| *G06T 15/04* | (2011.01) |
| *G06T 15/50* | (2011.01) |
| *G06T 15/60* | (2006.01) |

(52) U.S. Cl.
CPC ................. *G06T 15/80* (2013.01); *G06T 7/50* (2017.01); *G06T 15/04* (2013.01); *G06T 15/506* (2013.01); *G06T 15/60* (2013.01); *G06T 2207/20081* (2013.01)

(58) Field of Classification Search
None
See application file for complete search history.

(56) References Cited

U.S. PATENT DOCUMENTS

2023/0360182 A1* 11/2023 Fanello ................... G06T 11/00

OTHER PUBLICATIONS

Karras et al., "A Style-Based Generator Architecture for Generative Adversarial Networks", arXiv preprint arXiv:1812.04948v3 [cs. NE] Mar. 29, 2019, 12 pages.
Goodfellow, et al., "Generative Adversarial Nets", arXiv preprint arXiv:1406.2661v1 [stat.ML] Jun. 10, 2014, 9 pages.
Ho, et al., "Denoising Diffusion Probabilistic Models", arXiv preprint arXiv:2006.11239v2 [cs.LG] Dec. 16, 2020, 25 pages.
Barron, et al., "Shape, Illumination, and Reflectance from Shading" arXiv preprint arXiv:2010.03592v1 [cs.CV] Oct. 7, 2020, 26 pages.
Debevec et al., "Acquiring the Reflectance Field of a Human Face", SIGGRAPH 2000 Conference Proceedings, 2000, pp. 1-12.
Griffiths et al. "Outdoor Single-Image Relighting with Cast Shadows" arXiv preprint arXiv:2204.09341v1 [cs.GR] Apr. 20, 2022, 20 pages.
Rudnev, et al., "NeRF for Outdoor Scene Relighting", arXiv preprint arXiv:2112.05140v2 [cs.CV] Jul. 21, 2022, 22 pages.

* cited by examiner

*Primary Examiner* — Nurun Flora
(74) *Attorney, Agent, or Firm* — F. CHAU & ASSOCIATES, LLC

(57) ABSTRACT

A method, apparatus, non-transitory computer readable medium, apparatus, and system for scene re-lighting using direct shading control include obtaining an input image and a lighting direction indicator that describes a lighting direction. A direct shading map is generated based on the input image and the lighting direction indicator and a shaded image is generated depicting an object from the input image with shading consistent with the lighting direction based on the shading map.

19 Claims, 13 Drawing Sheets

Provide an input image and a lighting direction ⌐ 705

Generate a control signal ⌐ 710

Generate a shaded image using the control signal ⌐ 715

700

Obtain an input image and a lighting direction          805

Generate a direct shading map based on the input image and the lighting direction          810

Generate a shaded image depicting an object from the input image, with shading consistent with the lighting direction based on the direct shading map          815

Create a training set including a training image
and a direct shading map for the training image — 1205

Train, using the training set, an image
generation model to generate images depicting
an object from the training image with shading
based on the direct shading map — 1210

Figure 13:
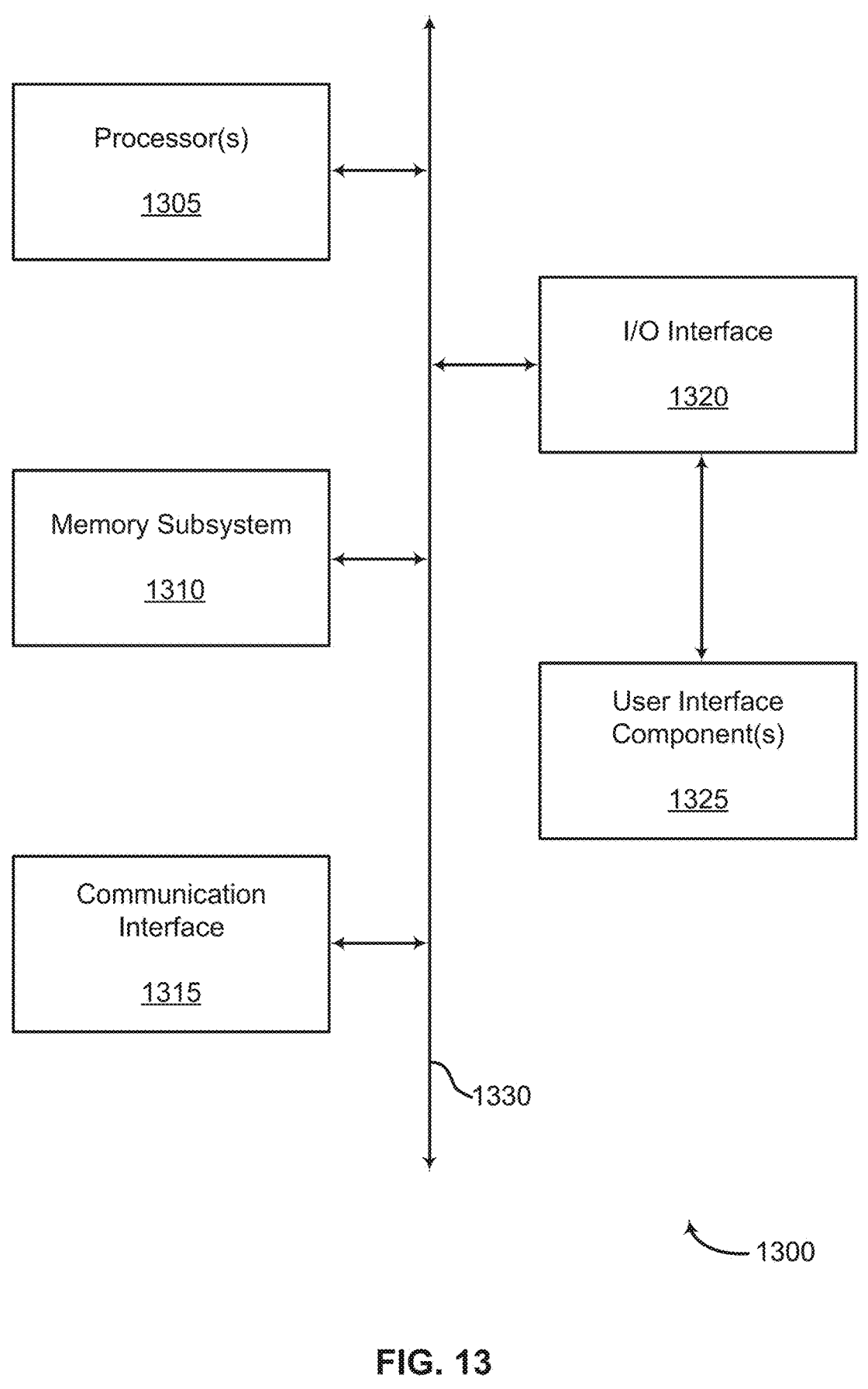

Processor(s)

1305

I/O Interface

1320

Memory Subsystem

1310

User Interface
Component(s)

1325

Communication
Interface

SCENE RE-LIGHTING USING DIRECT SHADING CONTROL

BACKGROUND

The following relates generally to image processing, and more specifically to re-lighting images. Image processing is a field of data processing that focuses on the manipulation and analysis of digital images. It includes techniques for altering the appearance, extracting useful information, and compressing images for efficient storage and transmission. Image processing is utilized in various applications, including photography, medical imaging, and remote sensing, facilitating the enhancement and interpretation of visual information.

Adjusting illumination in images is one application of image processing. This process is aimed at enhancing the visual quality of images by modifying their light attributes. Traditional methods include automated color balancing, which corrects the colors of an image based on the light sources present, and manual adjustments that allow users to selectively alter brightness, contrast, and exposure. These techniques are used to improve the clarity and aesthetics of images in various domains, such as photography, film production, and graphic design, but are generally limited to altering the existing lighting conditions of the image rather than introducing new ones.

SUMMARY

The present disclosure relates to image re-lighting. Re-lighting is an advanced form of illumination adjustment which allows for the simulation of light onto a scene from a given lighting direction. Embodiments include a re-lighting apparatus with a direct shading model and an image generation model stored therein. Given an input image and lighting direction, the direct shading model extracts a representation of shadows cast onto objects from the image in the lighting direction, as well as the surface shading of the objects. This representation referred to as a "direct shading map." The image generation model includes an image generator and a lighting control network. The lighting control network uses the direct shading map to create a guidance signal for the image generator. Then, the image generator generates an image with the content from the input image and with the given lighting direction. According to some aspects, the system begins from either an input image and a lighting direction, or a prompt describing the image and the lighting direction.

A method, apparatus, non-transitory computer readable medium, and system for re-lighting images are described. One or more aspects of the method, apparatus, non-transitory computer readable medium, and system include obtaining an input image and a lighting direction indicator that describes a lighting direction; generating, using a direct shading model, a direct shading map based on the input image and the lighting direction indicator; and generating, using an image generation model, a shaded image depicting an object from the input image with shading consistent with the lighting direction based on the direct shading map.

A method, apparatus, non-transitory computer readable medium, and system for re-lighting images are described. One or more aspects of the method, apparatus, non-transitory computer readable medium, and system include obtaining a training set including a training image and a direct shading map for the training image and training, using the training set, an image generation model to generate images depicting an object from the training image with shading based on the direct shading map.

An apparatus, system, and method for re-lighting images are described. One or more aspects of the apparatus, system, and method include at least one processor; at least one memory storing instructions executable by the at least one processor; a direct shading model comprising parameters stored in the at least one memory, wherein the direct shading model is configured to generate a direct shading map based on an input image and a lighting direction indicator that describes a lighting direction; and an image generation model comprising parameters stored in the at least one memory, wherein the image generation model is configured to generate a shaded image depicting an object from the input image with shading consistent with the lighting direction based on the direct shading map.

BRIEF DESCRIPTION OF THE DRAWINGS

FIG. 13 shows an example of a computing device according to aspects of the present disclosure.

DETAILED DESCRIPTION

Figure 1:
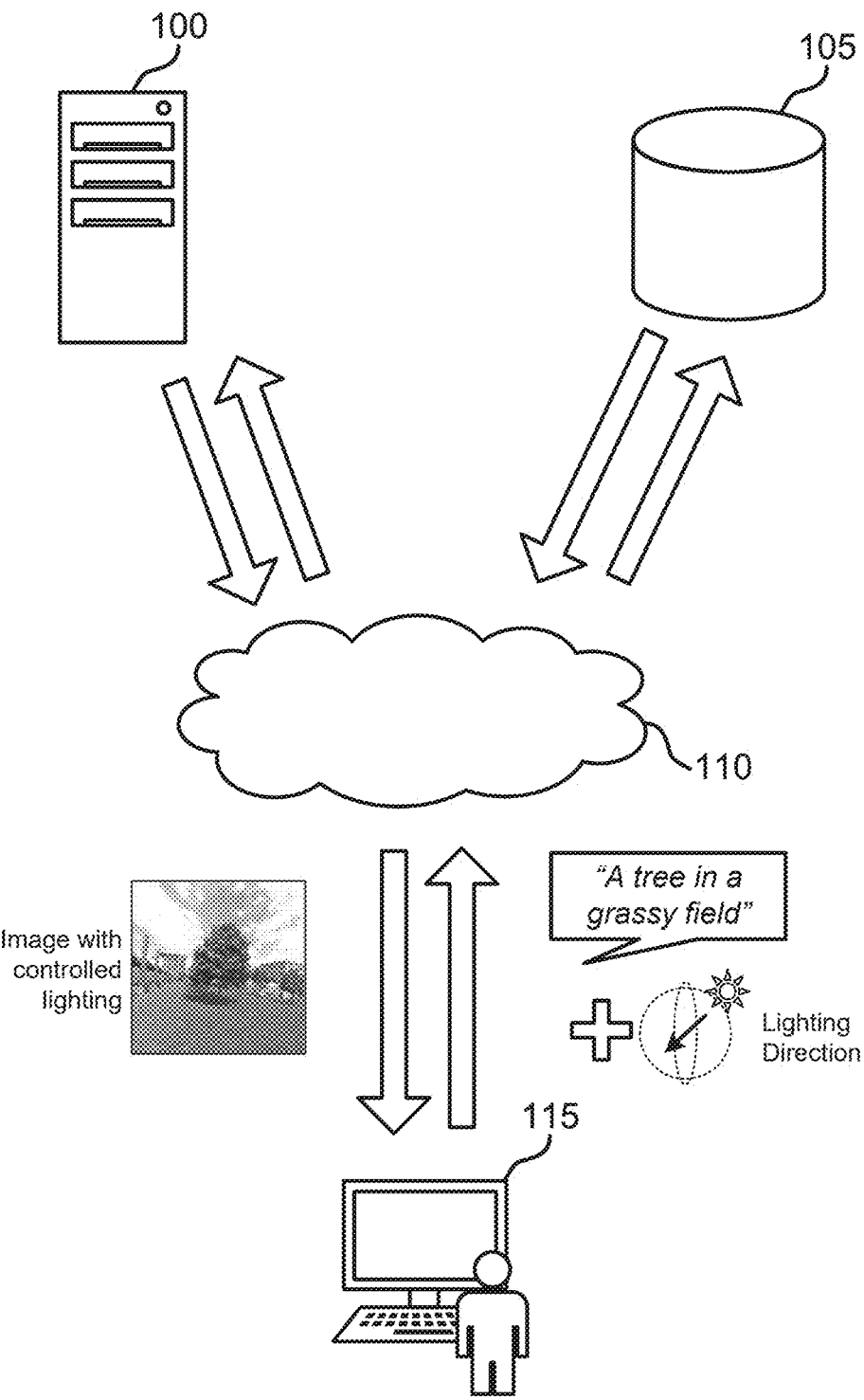
FIG. 1 shows an example of a re-lighting system according to aspects of the present disclosure.

Users employ many different creative pipelines when editing images according to various tasks. One task associated with image editing is lighting control. Lighting control in image editing is a process that adjusts the illumination attributes of an image. This aspect of image processing involves techniques such as automated color balancing, which alters image colors to fix over or under exposed regions of an image, and manual adjustments made by users to modify brightness, contrast, and exposure. These methods are used to enhance the visual quality of images across various applications like photography, film production, and graphic design. These methods are relatively basic, and focus on optimizing or correcting the existing lighting conditions within an image.

Recently, machine learning (ML) techniques have been used to enable a more advanced form of lighting control: scene re-lighting. Scene re-lighting involves altering lighting effects within scene, including changing the shadows cast by objects and the light reflected by objects. There are several conventional approaches to scene re-lighting.

One way to achieve custom lighting is to describe the lighting conditions in a text prompt to a generative model. However, without a reference image, this does not allow for re-lighting of a given scene. Further, even when using a reference image as basis, this approach does not model light transport, and the results are uncontrollable and often inconsistent.

Diffusion models in particular are able to generate detailed, realistic images when trained on large datasets. However, there is a lack of real-world datasets that include training pairs of a given scene with different lighting directions. Accordingly, diffusion models alone do not acquire an understanding of explicit lighting conditions during their training.

Another approach is to use a custom artificial neural network (ANN) to create a generator that is trained to generate a re-lit image from an input image and a lighting direction. This approach involves creating a dataset using synthetic objects such as 3D models from graphics engines, where the lighting can be controlled during the rendering process. However, this results in a model that is fundamentally different from a stable diffusion model. The custom ANN is a convolutional neural network (CNN)-based feed forward network that generates in one-step, and does not have the same capability as other generative models to generate highly detailed images. Further, due to the nature of training on the synthetic scenes, the re-lighting results from the models have a domain gap, and are prone to making implausible-looking images.

Embodiments of the concepts described herein include an image generation model with an image generator and a lighting control network. Embodiments further include a direct shading model configured to extract a normal map and a direct shading map from an input image, which are used as input to the lighting control network. Rather than altering an image generator directly, the lighting control network produces a guidance signal for the image generator to guide the generation process. According to some aspects, the image generator is a pre-trained model such as a Stable Diffusion (SD) model. By using the guidance signal from the lighting control network rather than training a new generator model directly, the image generator according to present embodiments retains the ability to generate realistic images learned during its pre-training, and does not produce artifacts that look like 3D models or other synthesized data.

Accordingly, embodiments of the present disclosure improve on conventional image generation models by producing more accurate depictions of target lighting conditions. Furthermore, embodiments enable a user to explicitly control the lighting conditions and direction of an image. By utilizing a trained lighting control network that takes a direct shading map as input, embodiments ensure content from an original input image is faithfully reproduced in the shaded version with lighting from the desired direction. Some embodiments leverage the capability of a large scale pre-trained base model to ensure the generated images are realistic.

A re-lighting system is described with reference to FIGS. 1-6. Techniques and methods for re-lighting are described with reference to FIGS. 7-9. Training methods are described with reference to FIGS. 10-12. A computing device configured to enable a re-lighting apparatus is described with reference to FIG. 13.

Re-Lighting System

An apparatus for re-lighting images is described. One or more aspects of the apparatus include at least one processor; at least one memory storing instructions executable by the at least one processor; a direct shading model comprising parameters stored in the at least one memory, wherein the direct shading model is configured to generate a direct shading map based on an input image and a lighting direction; and an image generation model comprising parameters stored in the at least one memory, wherein the image generation model is configured to generate a shaded image depicting an object from the input image with shading consistent with the lighting direction based on the direct shading map.

In some aspects, the image generation model comprises a residual control encoder trained to generate lighting control information for an image generator. In some aspects, the direct shading model comprises a density network trained to generate a density grid based on 3D features of the input image. In some aspects, the direct shading model comprises a shading network trained to generate the direct shading map based on the density grid.

As used herein, "normal" refers to a vector that is perpendicular to the surface at each point of an object, used to describe the orientation of the surface in 3D space. "Normal information" includes the normal vectors for objects within the scene of an image, and may include a normal map. As used herein, a "normal map" refers to an image that stores the normals of an object's surface. This map uses color channels to encode the direction of the geometric normal corresponding to each pixel. In some cases, the RGB channels of the map are used to represent the X, Y, and Z components of the normal vector. However, these color channels will not be reproduced in the Figures, which are rendered in black and white.

FIG. 1 shows an example of a re-lighting system according to aspects of the present disclosure. The example shown includes re-lighting apparatus 100, database 105, network 110, and user interface 115.

In an example process, a user provides a prompt describing an image, as well as a lighting direction indicator that describes a lighting direction via user interface 115. The lighting direction indicator can include a discrete input such as "front", "side", or "back", or may include more specific values through user interaction with a graphical user interface (GUI) element such as a directional icon, gizmo, or set of sliders. Specific input values may include but are not limited to azimuth and elevation angles, or Euler angles. In some cases the lighting direction can indicate a light source at infinity (i.e., approximating the sun) or a light source at a specified location relative to an object in the image. For example, the light direction can be represented as an object storing multiple parameters corresponding to 3D coordinates or angles, one or more labels indicating the lighting direction, or as an embedding in a vector space.

Re-lighting apparatus 100 will first generate an initial image based on the prompt, and then extract a normal map and a direct shading map from the image, with the direct shading map including shadow information consistent with the lighting direction. Then, re-lighting apparatus 100 uses the normal map and the shading map as a control signal for a lighting control network, which generates a guidance signal therefrom. The guidance signal is an encoding of the information from the control signal, and includes information about object shapes and shadows. An image generator uses the guidance signal to condition the generation of a new image. This new image includes the content described in the initial prompt, lit in the direction indicated by the lighting direction. Alternatively, the user may provide an input image rather than a text prompt, and the system will perform a similar process, except for the generation of the initial image.

Embodiments of re-lighting apparatus 100 are implemented on a server. A server provides one or more functions to users linked by way of one or more of the various networks, such as network 110. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus. Re-lighting apparatus 100 is an example of, or includes aspects of, the corresponding element described with reference to FIG. 2.

Database 105 is configured to store information used by re-lighting apparatus 100, such as model parameters, stock images, generated images, training data, and the like. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with a database controller. In other cases, the database controller may operate automatically without user interaction.

Network 110 facilitates the transfer of information between includes re-lighting apparatus 100, database 105, and a user, e.g. via user interface 115. In some cases, network 110 is referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

A user interface 115 enables a user to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI). In some cases, the user interface 115 is an edge device separate from the re-lighting apparatus 100, e.g., as illustrated in FIG. 1. However, in some cases, some parts or all of the user interface 115 is implemented on the same device as re-lighting apparatus 100, as shown in FIG. 2.

Figure 2:
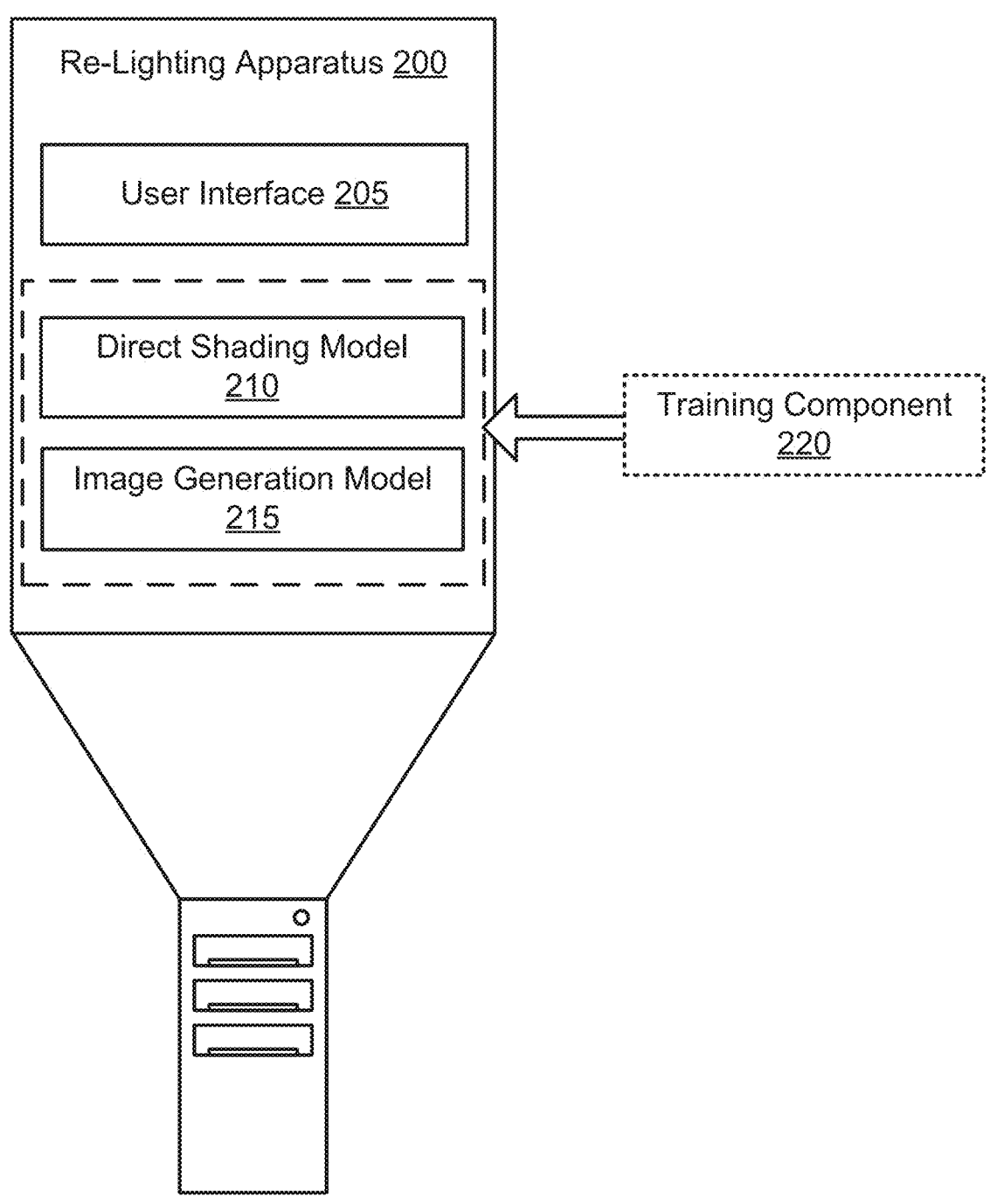
FIG. 2 shows an example of a re-lighting apparatus according to aspects of the present disclosure.

FIG. 2 shows an example of a re-lighting apparatus 200 according to aspects of the present disclosure. The example shown includes re-lighting apparatus 200, user interface 205, direct shading model 210, image generation model 215, and training component 220. Re-lighting apparatus 200 is an example of, or includes aspects of, the corresponding element described with reference to FIG. 1. User interface 205 is an example of, or includes aspects of, the corresponding element described with reference to FIG. 1.

In the example illustrated in FIG. 2, user interface 205 is implemented on re-lighting apparatus 200. User interface 205 may include GUI elements to allow a user to input a text prompt or a starting image. User interface 205 may further include elements to allow the user to input a desired lighting direction. For example, user interface 205 may include a directional icon, gizmo, or set of sliders, or a text field to allow the user to input values such as azimuth and elevation angles.

Embodiments of direct shading model 210 and image generation model 215 include software components based in machine learning (ML) techniques, such as artificial neural networks (ANNs). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Direct shading model 210 is configured to generate a direct shading map from an input image and an input lighting direction. Embodiments of direct shading model 210 include a depth extractor ANN configured to estimate the distances of objects from a camera's viewpoint in the input image, a density ANN configured predict a 3D density field of the objects, and the capability to perform ray marching operations on the 3D density field. The ray marching operations generate a cast shadows map, a normal map, and an N-dot-L map for the input image. A shading network predicts a coarse shading map based on the result of the ray marching operations, and a refinement network refines the coarse shading map using the original input image as guidance to generate a direct shading map, which accurately represents the shading in the scene based on the input lighting direction. The direct shading map and the normal map are used as a control signal for a lighting control network. Additional detail regarding this pipeline is provided with reference to FIG. 3.

In some examples, direct shading model 210 encodes the input image to obtain image features. In some examples, direct shading model 210 projects the image features in a depth dimension to obtain a three dimensional (3D) feature grid, where the direct shading map is based on the 3D feature grid. In some examples, direct shading model 210 generates a depth map based on the input image, where the 3D feature grid is based on the depth map. In some examples, direct shading model 210 generates a density grid based on the 3D feature grid. In some examples, direct shading model 210 generates a shading input based on the density grid, where the shading input includes a shadow map, a normal map, an N-dot-L map, or any combination thereof, and where the direct shading map is generated based on the shading input. In some examples, direct shading model 210 generates a coarse shading map based on the density grid. In some examples, direct shading model 210 refines the coarse shading map based on the input image to obtain the direct shading map. Direct shading model 210 is an example of, or includes aspects of, the corresponding element described with reference to FIG. 9.

Image generation model 215 is configured to generate a shaded image based on an input image and the shading input from direct shading model 210. The shaded image includes the content from the input image, with the lighting and shadows in accordance with the input lighting direction given to direct shading model 210. Embodiments of image generation model 215 include an image generator ANN and a lighting control network ANN. According to some aspects, the image generator is based on a diffusion network. In some cases, the lighting control network includes an encoder based on residual blocks, as contrasted with a conventional control network based on feed-forward convolutional layers. Additional detail regarding an image generation model is described with reference to FIG. 4.

Training component 220 is configured to update parameters of the machine learning model components in relighting apparatus 200. Training component 220 may be implemented within re-lighting apparatus 200, or, alternatively, may be implemented in a device other than re-lighting apparatus 200. According to some aspects, training component 220 trains the machine learning model components of relighting apparatus 200 using training data including a base image, a lighting direction, a caption, a normal map, a shading map, a target image, a target shading, or a combination thereof. In some embodiments, the training data is extended by inverting the training data: using the target image as input, extracting a lighting direction of the base image, and instructing the model to predict the base image. According to some aspects, parameters of the depth extractor and the image generator are held fixed, while other parameters of the machine learning model components of relighting apparatus 200 are updated during the training process.

According to some aspects, training component 220 creates a training set including a training image and a direct shading map for the training image. In some examples, training component 220 trains, using the training set, an image generation model 215 to generate images depicting an object from the training image with shading based on the direct shading map. In some examples, training component 220 trains the direct shading model 210 to generate the direct shading map based on the training image. In some examples, training component 220 extracts a lighting direction from the training image, where the direct shading map is based on the lighting direction. In some examples, training component 220 computes a reconstruction loss based on the reconstructed shading map and the direct shading map, where the image generation model 215 is updated based on the reconstruction loss. Additional detail regarding training methods are described with reference to FIGS. 10-12.

Figure 3:
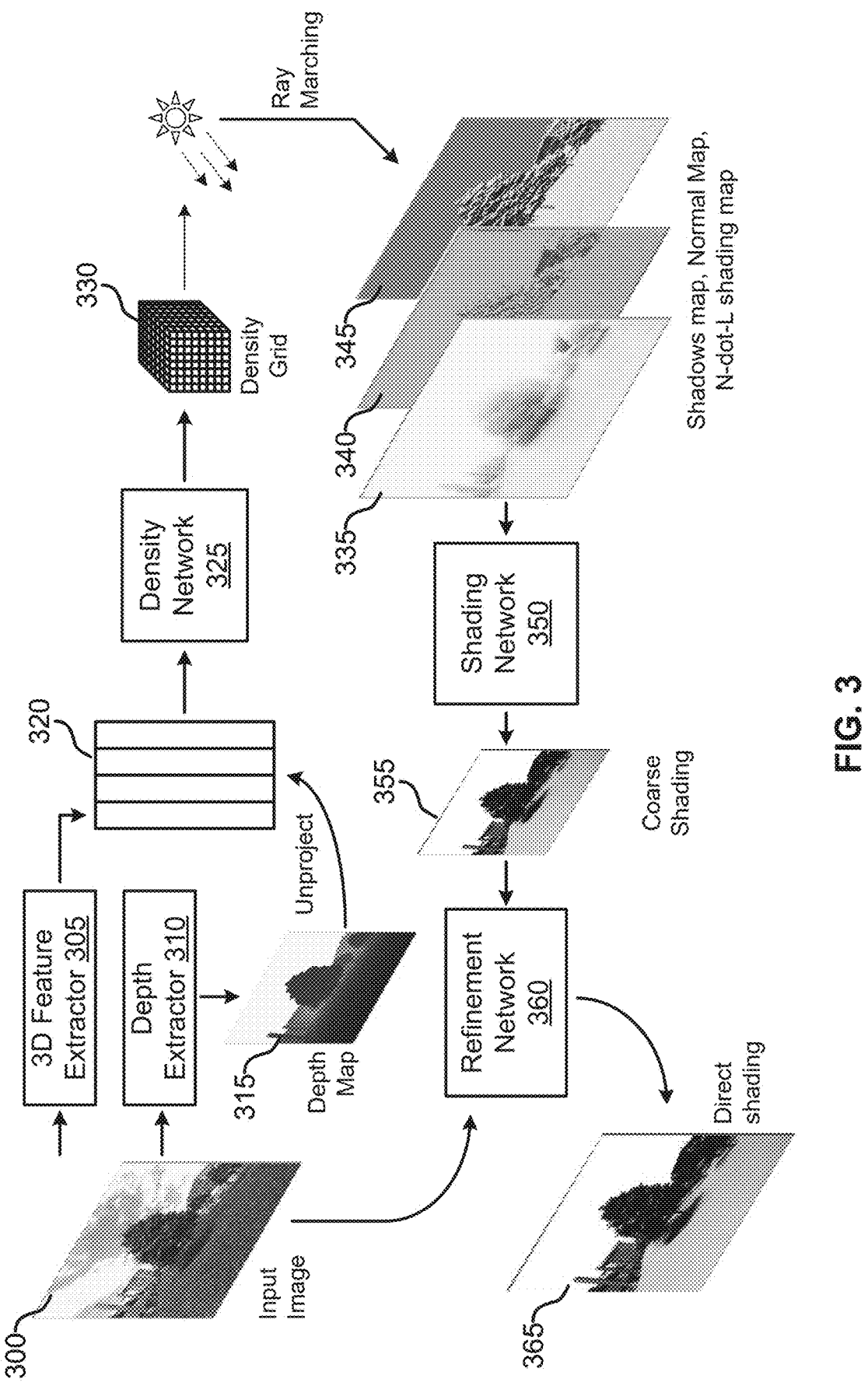
FIG. 3 shows an example of a direct shading model according to aspects of the present disclosure.

FIG. 3 shows an example of a direct shading model according to aspects of the present disclosure. The example shown includes input image 300, 3D feature extractor 305, depth extractor 310, depth map 315, feature grid 320, density network 325, density grid 330, cast shadows map 335, normal map 340, N-dot-L map 345, shading network 350, coarse shading map 355, refinement network 360, and direct shading map 365. Normal map 340 is an example of, or includes aspects of, the corresponding element described with reference to FIGS. 4, 10, and 11. Direct shading map 365 is an example of, or includes aspects of, the corresponding element described with reference to FIGS. 4 and 11.

Embodiments of the present disclosure control the illumination of generated images by providing lighting information to an image generator, such as a diffusion model. According to some aspects, embodiments include a direct shading model used to estimate direct shading from a single input image. The direct shading provides information about both shading of objects in the scene, as well as shadows cast by the objects. In some embodiments, the direct-shading represents a single-bounce illumination for casting shadows.

The direct shading model receives an input image 300 and a coarse input lighting direction (e.g., as described with reference to FIG. 1) and computes direct shading information therefrom in the form of an image, e.g., a "direct shading map." The direct shading map can be 1-channel, i.e., grayscale, or can be multiple channels, e.g., RGB. Within the direct shading model, a 3D feature extractor 305 first encodes the input image to obtain a set of features. According to some aspects, the 3D feature extractor 305 includes a 2D convolutional neural network (CNN) that encodes features within width-by-height space, and then "unprojects" these features into a 3D, multi-plane representation in normalized device coordinates (NDC), which may be in the range $((-1, 1), (-1,-1), (-1, 1))$. These features may be arranged in a 3D space as feature grid 320.

A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

A depth extractor network predicts the depth of objects from the point of view of the camera for a given image. This depth information may be encoded into an image, i.e., a depth map 315. According to some aspects, the 3D feature extractor uses the depth information in the unproject operation to distribute the 3D features. For example, given a pixel's depth, the features may be linearly distributed between the two planes closest to the depth.

A density network 325 processes the 3D features in feature grid 320 to compute density grid 330, which is a tensor that includes density values for each position in the scene of the image. Then, embodiments perform ray marching operations within density grid 330 according to the input lighting direction to compute cast shadows map 335, normal map 340, and N-dot-L map 345. According to some aspects, embodiments perform a type of ray marching known as "volumetric ray-marching," which samples points along a plurality of rays, accumulating intersections along the ray to determine the value of the pixel corresponding to the ray. The cast shadows map 335 includes information about the shadows cast by objects in the scene, the normal map 340 stores normal information about objects in the scene using color channels to encode the direction of the geometric normal corresponding to each pixel, and the N-dot-L map 345 represents the cosine of the angle between the normal vectors of the surfaces and the light direction vectors. Then, shading network 350, another trained ANN, transforms the cast shadows map 335 and the N-dot-L map 345 into coarse shading map 355. The shading represents both the effect of shadows onto object surfaces as well as the shadows cast by the objects. In some embodiments, the coarse shading map 355 is further improved upon by using a refinement network 360 to produce direct shading map 365. According to some aspects, the refinement network 360 uses input image 300 in the refinement process.

Figure 4:
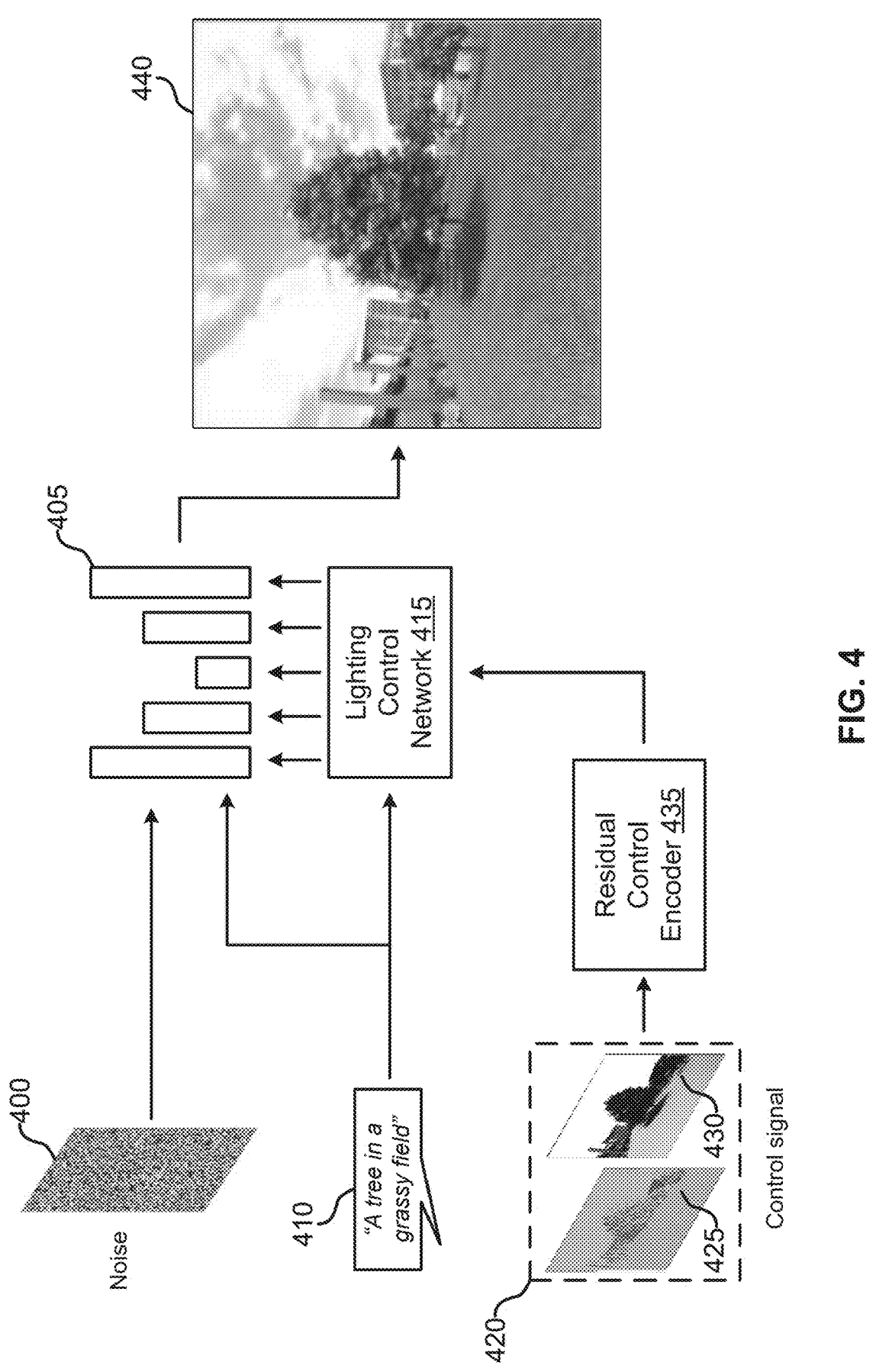
FIG. 4 shows an example of an image generation model according to aspects of the present disclosure.

FIG. 4 shows an example of an image generation model according to aspects of the present disclosure. The example shown includes noise 400, image generator 405, prompt 410, lighting control network 415, control signal 420, residual control encoder 435, and output image 440. Noise 400 is an example of, or includes aspects of, the corresponding element described with reference to FIG. 11. Image generator 405 is an example of, or includes aspects of, the corresponding element described with reference to FIGS. 6, 9, and 11. Lighting control network 415 is an example of, or includes aspects of, the corresponding element described with reference to FIGS. 6 and 11. According to some aspects, "lighting control network" refers to both lighting control network 415 and residual control encoder 435 simultaneously.

FIG. 4 illustrates an image generation model used to generate an image with controlled lighting according to aspects of the present disclosure. In this example, image generator 405 generates output image 440 based on noise 400, prompt 410, and guidance signal from lighting control network 415. The direct shading model described with reference to FIG. 3 may generate a control signal 420 for use by lighting control network 415. In one aspect, control signal 420 includes normal map 425 and direct shading map 430.

According to some aspects, lighting control network 415 encodes, using a residual control encoder 435, control signal 420 to obtain lighting control information, where the output image 440 is generated based on the lighting control information. The lighting control information may be applied to one or more resolution blocks of the image generator 405 during generation.

The residual control encoder 435 includes residual blocks with skip connections. In some cases, the use of residual blocks with skip connections allow residual control encoder 435 to be implemented with a large number of layers, and still maintain stability during training. For example, this architecture can mitigate the vanishing gradient problem associated with training deep feed forward networks. During training, a training component may update parameters of residual control encoder 435 while simultaneously updating parameters of a residual control decoder, which is configured to reproduce the control signal to ensure alignment with the original input image. Additional detail regarding training of the residual control encoder 435 is described with reference to FIG. 11.

Figure 5:
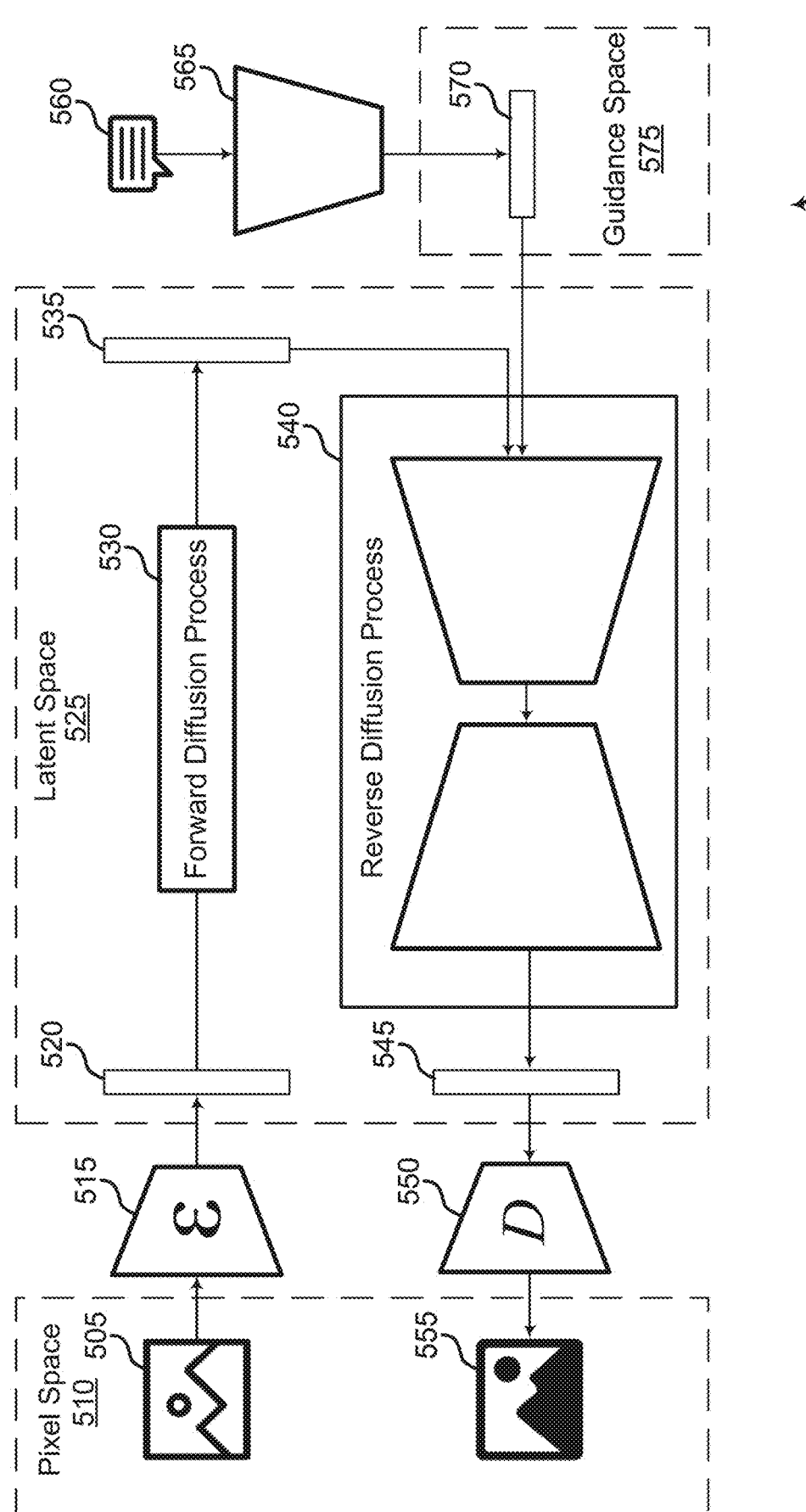
FIG. 5 shows an example of an image generator according to aspects of the present disclosure.

FIG. 5 shows an example of an image generator according to aspects of the present disclosure. In this example, the image generator is implemented as a diffusion neural network. The example shown includes diffusion neural network 500, original image 505, pixel space 510, image encoder 515, original image features 520, latent space 525, forward diffusion process 530, noisy features 535, reverse diffusion process 540, denoised image features 545, image decoder 550, output image 555, text prompt 560, text encoder 565, guidance features 570, and guidance space 575.

In some examples, diffusion models are based on a neural network architecture known as a U-Net. The U-Net takes input features having an initial resolution and an initial number of channels, and processes the input features using an initial neural network layer (e.g., a convolutional network layer) to produce intermediate features. The intermediate features are then down-sampled using a down-sampling layer such that down-sampled features have a resolution less than the initial resolution and a number of channels greater than the initial number of channels.

This process is repeated multiple times, and then the process is reversed. That is, the down-sampled features are up-sampled using up-sampling process to obtain up-sampled features. The up-sampled features can be combined with intermediate features having a same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features could include a vector representation of an input prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt describing content to be included in a generated image. For example, a user may provide the prompt "a person playing with a cat". In some examples, guidance can be provided in a form other than text, such as via an image, a sketch, or a layout. For example, the guidance may be combination of features from an output of a prompt encoder, as well as lighting control information produced by a lighting control network as described with reference to FIGS. 4 and 6. The system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A noise map is initialized that includes random noise. The noise map may be in a pixel space or a latent space. By initializing an image with random noise, different variations of an image including the content described by the conditional guidance can be generated. Then, the system generates an image based on the noise map and the conditional guidance vector.

A diffusion process can include both a forward diffusion process for adding noise to an image (or features in a latent space) and a reverse diffusion process for denoising the images (or features) to obtain a denoised image. The forward diffusion process can be represented as $q(x_t|x_{t-1})$, and the reverse diffusion process can be represented as $p(x_{t-1}|x_t)$. In some cases, the forward diffusion process is used during training to generate images with successively greater noise, and a neural network is trained to perform the reverse diffusion process (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process, the model begins with noisy data $x_T$, such as a noisy image and denoises the data to obtain the $p(x_{t-1}|x_t)$. At each step $t-1$, the reverse diffusion process takes $x_t$, such as first intermediate image, and t as input. Here, t represents a step in the sequence of transitions associated with different noise levels, The reverse diffusion process outputs $x_{t-1}$, such as second intermediate image iteratively until $x_T$ is reverted back to $x_0$, the original image. The reverse process can be represented as:

$$p_\theta(x_{t-1}|x_t) := N(x_{t-1}; \mu_\theta(x_t, t), \Sigma_\theta(x_t, t)). \quad (1)$$

The joint probability of a sequence of samples in the Markov chain can be written as a product of conditionals and the marginal probability:

$$x_T : p_\theta(x_{0:T}) := p(x_T) \prod_{t=1}^{T} p_\theta(x_{t-1}|x_t), \quad (2)$$

where $p(x_T)=N(x_T; 0, I)$ is the pure noise distribution as the reverse process takes the outcome of the forward process, a sample of pure noise, as input and $$\prod_{t=1}^{T} p_\theta(x_{t-1}|x_t)$$

represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_7$ represent noisy images, and ã represents the generated image with high image quality.

A diffusion model may be trained using both a forward and a reverse diffusion process. In one example, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

The system then adds noise to a training image using a forward diffusion process in N stages. In some cases, the forward diffusion process is a fixed process where Gaussian noise is successively added to an image. In latent diffusion models, the Gaussian noise may be successively added to features in a latent space.

At each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

The training system compares predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data. The training system then updates parameters of the model based on the comparison. For example, parameters of a U-Net may be updated using gradient descent. Time-dependent parameters of the Gaussian transitions can also be learned.

Figure 6:
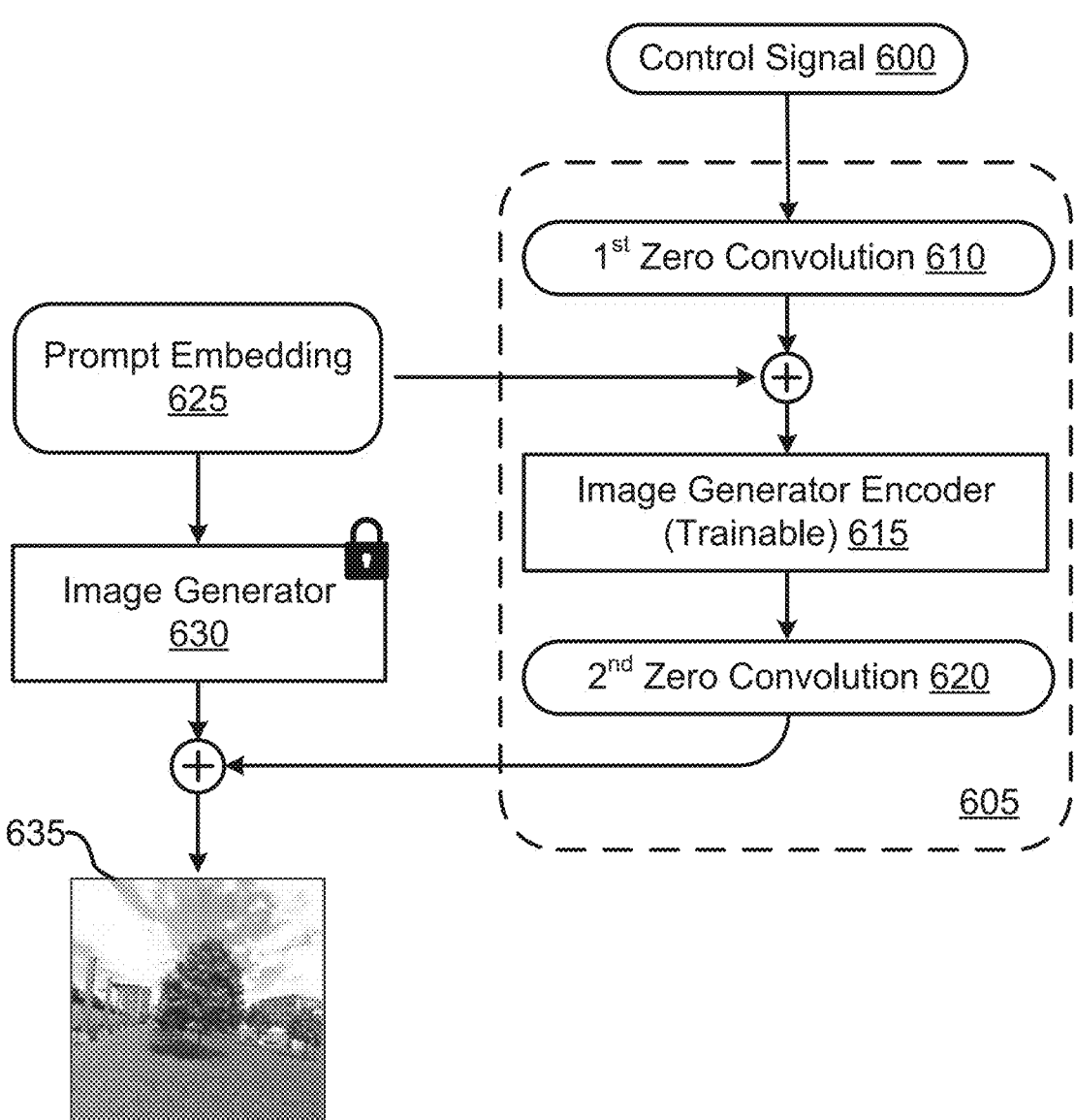
FIG. 6 shows an example of a lighting control network connected to an image generator according to aspects of the present disclosure.

FIG. 6 shows an example of a lighting control network 605 connected to an image generator 630 according to aspects of the present disclosure. The example shown includes control signal 600, lighting control network 605, prompt embedding 625, image generator 630, and generated image 635. Image generator 630 is an example of, or includes aspects of, the corresponding element described with reference to FIGS. 4, 5, 9, and 11.

In this embodiment, lighting control network 605 includes a set of training parameters including first zero convolution block 610, image generator encoder copy with trainable parameters 615, and second zero convolution block 620. These parameters may be updated during a training process, while the parameters of a pre-trained image generator 630 are held fixed.

Lighting control network 605 may include some aspects of ControlNet. ControlNet is a neural network structure to control image generation models by adding extra conditions. In some embodiments, a ControlNet architecture copies the weights from some of the neural network blocks of image generator 630 to create a "trainable" copy, such as the trainable copy of the encoder from the image generator. The trainable copy learns the condition. In the context of the re-lighting system, the trainable copy learns to generate an embedding that conditions the image generator to create images that include the content from the input image, and that depicts in accordance with the input lighting direction. The "locked" copy, i.e. image generator 630, preserves the parameters of the original generative model such as a stable diffusion model. The trainable copy can be tuned with a relatively small dataset of image pairs, while preserving the locked copy ensures that the original model is preserved and does not lose the knowledge or diversity from its pretraining. In some embodiments, the trainable copy, image generator encoder copy with trainable parameters 615, is based on a residual block architecture rather than the feed forward CNN included in the encoder of image generator 630. Accordingly, this piece is sometimes referred to herein as a residual control encoder.

In some embodiments, one or more zero convolution layers are added to the trainable copy, such as first zero convolution block 610 and second zero convolution block 620. A "zero convolution" layer is 1×1 convolution with both weight and bias initialized as zeros. Before training, the zero convolution layers output all zeros. Accordingly, the lighting control network 605 will not cause any distortion. As the training proceeds, the parameters of the zero convolution layers deviate from zero and the influence of the lighting control network 605 on the output grows. According to some aspects, an embedding of a text prompt, i.e. prompt embedding 625, is added to help the network learn semantic associations.

A ControlNet or a ControlNet-like architecture can be used to control a diffusion U-Net (i.e., to add controllable parameters or inputs that influence the output), such as a U-net included in image generator 630. In one example, control signal 600 includes a normal map concatenated with a direct shading map, and is input to the lighting control network 605. The output of the lighting control network 605, e.g., the "lighting control information" as described herein, can be input to decoder layers of the U-Net. Accordingly, the generated image 635 produced by the re-lighting system described herein will include the content from the input image and the shading in accordance with the input lighting direction. All the while, the system maintains the diversity and the semantic understanding provided by image generator 630.

Re-Lighting Images

A method for re-lighting images is described. One or more aspects of the method include obtaining an input image and a lighting direction; generating, using a direct shading model, a direct shading map based on the input image and the lighting direction; and generating, using an image generation model, a shaded image depicting an object from the input image with shading consistent with the lighting direction based on the direct shading map.

Some examples of the method, apparatus, non-transitory computer readable medium, and system further include encoding the input image to obtain image features. Some examples further include projecting the image features in a depth dimension to obtain a three dimensional (3D) feature grid, wherein the direct shading map is based on the 3D feature grid. Some examples further include generating a depth map based on the input image, wherein the 3D feature grid is based on the depth map. Some examples further include generating a density grid based on the 3D feature grid.

Some examples of the method, apparatus, non-transitory computer readable medium, and system further include generating a shading input based on the density grid, wherein the shading input includes a shadow map, a normal map, an N-dot-L map, or any combination thereof, and wherein the direct shading map is generated based on the shading input. Some examples include generating a coarse shading map based on the density grid. Some examples further include refining the coarse shading map based on the input image to obtain the direct shading map. Some examples of the method, apparatus, non-transitory computer readable medium, and system further include performing a reverse diffusion process using the direct shading map as a control guidance.

Some examples of the method, apparatus, non-transitory computer readable medium, and system further include encoding, using a residual control encoder, the direct shading map to obtain lighting control information, wherein the shaded image is generated based on the lighting control information. In some aspects, the residual control encoder is trained based on an output of a residual control decoder that reconstructs an input of the residual control encoder.

Some examples further include obtaining a normal map, wherein the lighting control information is generated based on the normal map. Some examples of the method, apparatus, non-transitory computer readable medium, and system further include obtaining a text prompt, wherein the shaded image is generated based on the text prompt.

Figure 7:
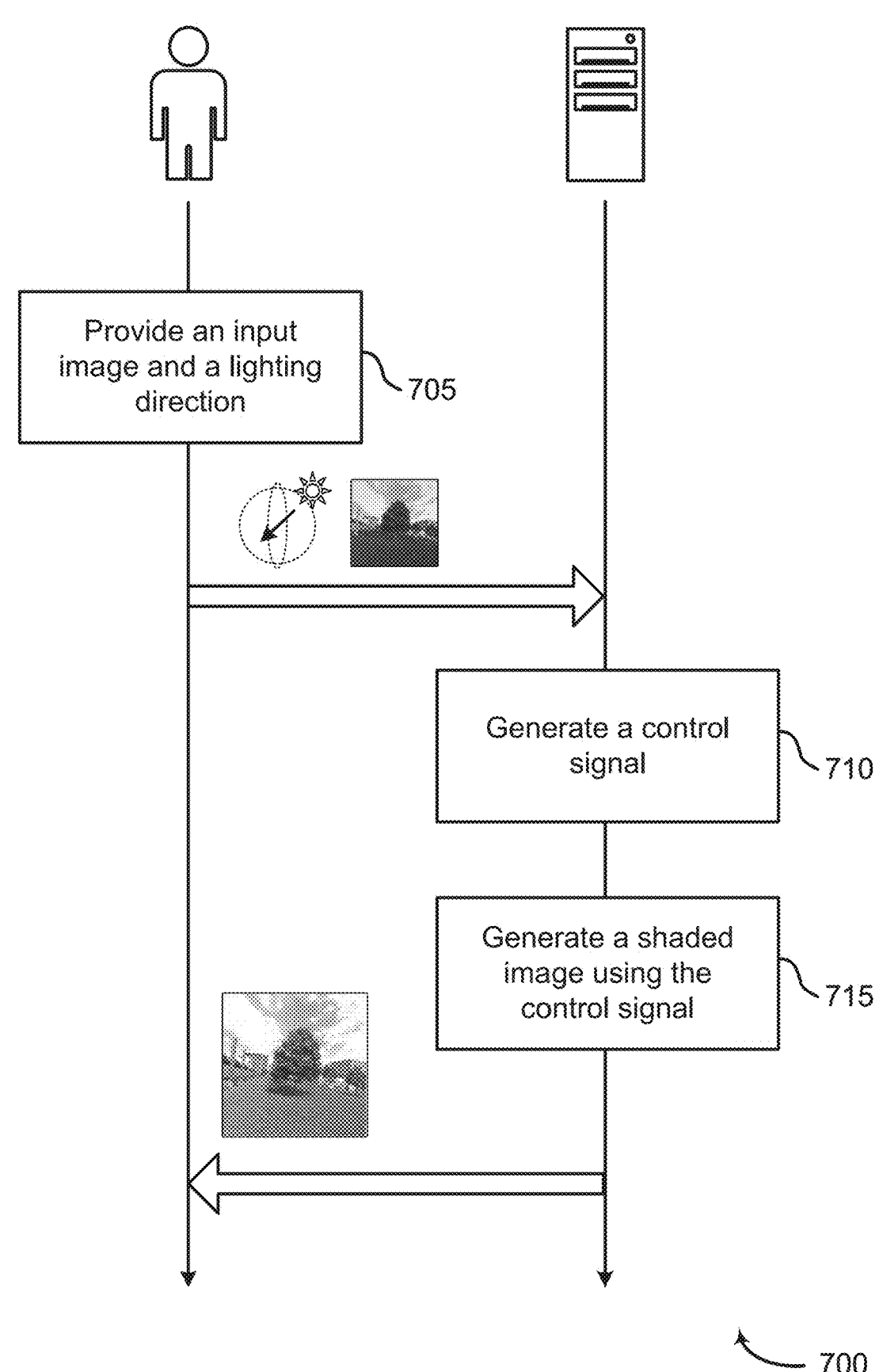
FIG. 7 shows an example of a method for re-lighting an input image from a user according to aspects of the present disclosure.

FIG. 7 shows an example of a method 700 for re-lighting an input image from a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, a user provides an input image and a lighting direction indicator that describes a lighting direction. In some cases, the user may do so via a user interface as described with reference to FIGS. 1 and 2. The lighting direction indicator can include a discrete input such as "front", "side", or "back", or with more specific values that specify the direction of one or more light sources such as azimuth and elevation angles or Euler angles. In some cases the lighting direction can indicate a light source at infinity (i.e., approximating the sun) or a light source at a specified location relative to an object in the image.

At operation 710, the system generates a control signal. In some cases, the operations of this step refer to, or may be performed by, a direct shading model as described with reference to FIGS. 2 and 9. For example, the system may generate a normal map and a direct shading map based on the input image and the lighting direction. The control signal may include the normal map and the direct shading map. For example, the control signal may be the normal map concatenated with the direct shading map.

At operation 715, the system generates a shaded image using the control signal. In some cases, the operations of this step refer to, or may be performed by, an image generation model as described with reference to FIGS. 2 and 9. For example, the image generation model may include an image generator and a lighting control network. The lighting control network may generate lighting control information from the control signal, and input the lighting control information to one or more layers of the image generator. The lighting control information conditions the generation process so that the image generator produces an image including the content from the original input image, and with shading in accordance with the lighting direction.

Figure 8:
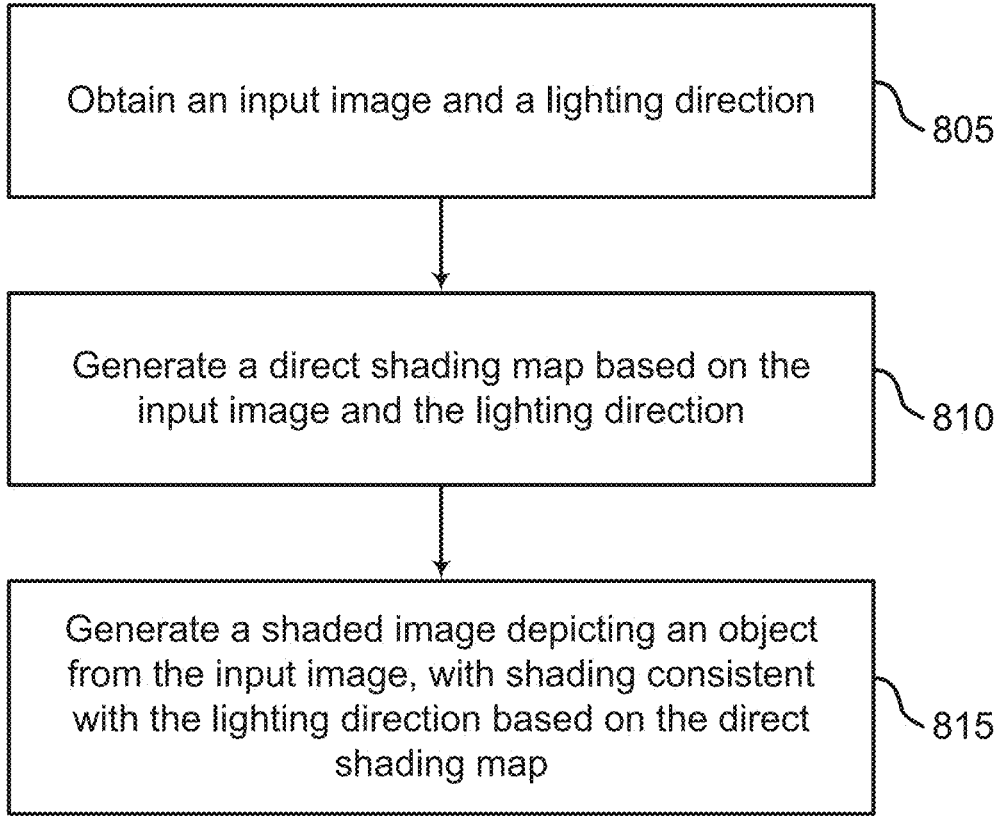
FIG. 8 shows an example of a method for generating a shaded image according to aspects of the present disclosure.

FIG. 8 shows an example of a method 800 for generating a shaded image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains an input image and a lighting direction. A user may, for example, upload or otherwise reference a starting image, and then indicate a desired lighting direction using a GUI element. The lighting direction represents the direction of light cast by some light source. In outdoor scenes, this could be the sun, for example. In some cases, the user may first generate an image based on a text prompt, in which case the generated image is used as the input image. Accordingly, the user can either specify an existing image for re-lighting, or synthesize a new image with controlled lighting.

At operation 810, the system generates a direct shading map based on the input image and the lighting direction. In some cases, the operations of this step refer to, or may be performed by, a direct shading model as described with reference to FIGS. 2 and 9. The shading map depicts single-bounce illumination of extracted geometry from objects within the image, where the geometry is predicted by a density network of the direct shading model. Additional detail regarding a direct shading model and a pipeline for extracting the direct shading map is provided with reference to FIG. 3.

At operation 815, the system generates a shaded image depicting an object from the input image with shading consistent with the lighting direction based on the direct shading map. "Shading" refers to the change in colors from incident lighting and from shadows. For example, trees, walls, and other structures in the input image may cast shadows in the lighting direction, as well as have shadows cast on them in the lighting direction. Furthermore, the shading consistency ensures that shadows cast onto the objects matches with the shapes of the objects casting the shadows. The leaf patterns of a tree, for example, will be projected onto the wall behind the tree, relative to the lighting direction. In some cases, the operations of this step refer to, or may be performed by, an image generation model as described with reference to FIGS. 2 and 9. The image generation model includes a lighting control network configured to generate a control signal, herein referred to as "lighting control information", which constrains the generation so as to generate content from the original image including object geometry and color information, as well as shading in accordance with the input lighting direction. Additional detail regarding an image generation model is provided with reference to FIGS. 4-5.

Figure 9:
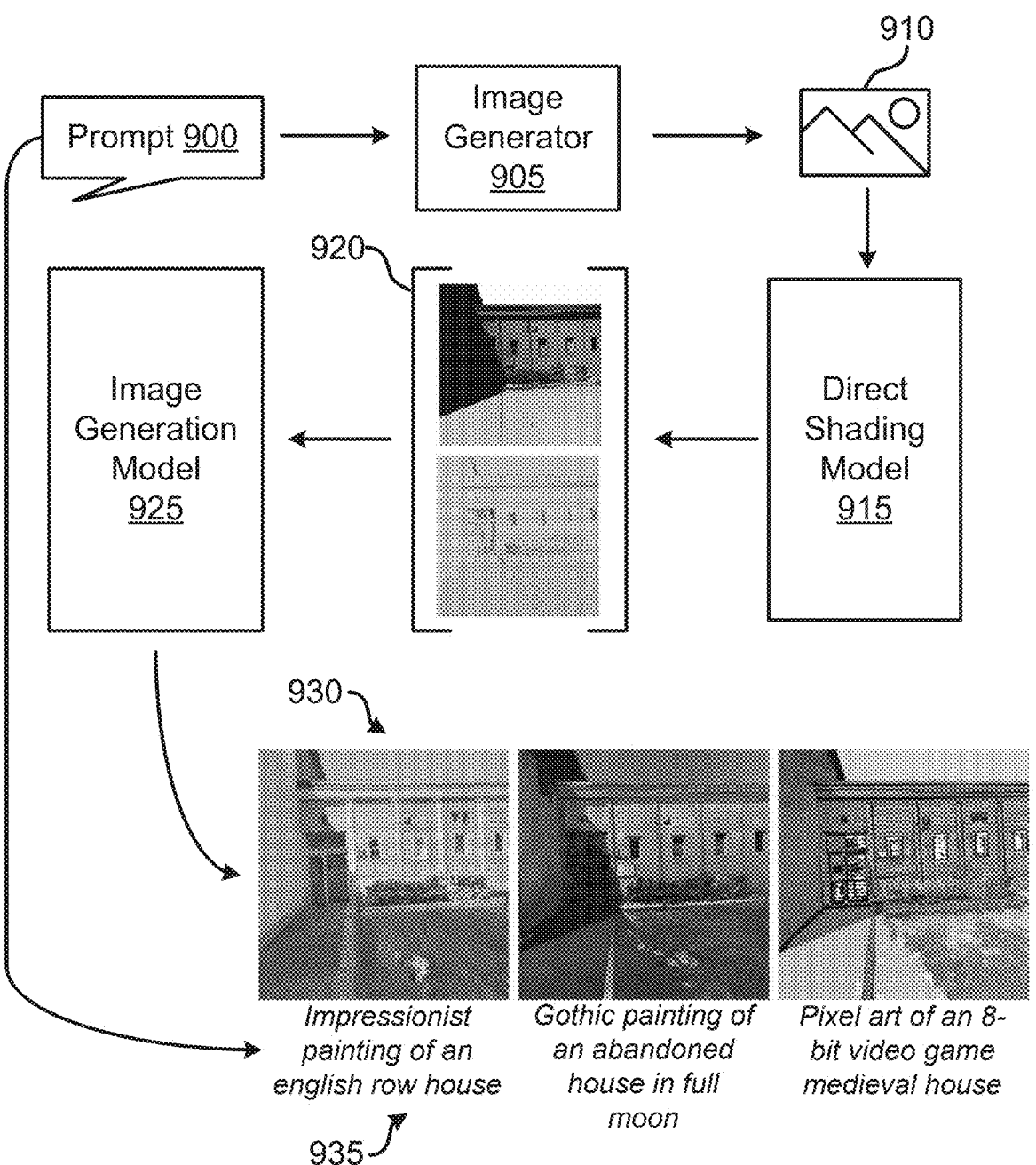
FIG. 9 shows an example of a pipeline for synthesizing an image and re-lighting the synthesized image according to aspects of the present disclosure.

FIG. 9 shows an example of a pipeline for synthesizing an image and re-lighting the synthesized image according to aspects of the present disclosure. The example shown includes prompt 900, image generator 905, basis image 910, direct shading model 915, control signal 920, image generation model 925, synthesized images 930, and captions 935.

Direct shading model 915 is an example of, or includes aspects of, the corresponding element described with reference to FIG. 2. Image generation model 925 is an example of, or includes aspects of, the corresponding element described with reference to FIG. 2. Image generator 905 is an example of, or includes aspects of, the corresponding element described with reference to FIGS. 4, 6, and 11. According to some aspects, image generator 905 may be the same as the image generator included within image generation model 925, or may be a different image generation model, such as a generative adversarial network (GAN), variational auto-encoder (VAE), or other model.

In this example pipeline, a user provides a prompt 900 rather than an input image directly. An image generator 905 then generates basis image 910 image from the prompt. A direct shading model 915, such as the one described with reference to FIG. 3, extracts control signal 920 including a normal map and a direct shading map from basis image 910. The control signal 920 is input to an image generation model 925, such as the one(s) described with reference to FIGS. 4 and 5, which then generates synthesized images 930. As apparent from FIG. 9, the image generation model 925 is configured to generate shaded images in accordance with a variety of input prompts, while maintaining consistent shading in its results. For example, the synthesized images 930 depict a variety of styles from captions 935, which are the prompts used to generate each image. According to some aspects, this is a result of including a prompt embedding with the control signal as input to a lighting control network, e.g., as described with reference to FIG. 4, which can aid in developing additional semantic understanding during training.

Training

A method for re-lighting images is described. One or more aspects of the method include obtaining a training set including a training image and a direct shading map for the training image and training, using the training set, an image generation model to generate images depicting an object from the training image with shading based on the direct shading map. Some examples further include training the direct shading model to generate the direct shading map based on the training image. In some embodiments, the method includes creating a training set by producing training data including an initially lighted image, a target lighted image, a training shading map, a training caption, or some combination thereof.

Some examples of the method, apparatus, non-transitory computer readable medium, and system further include extracting a lighting direction from the training image, wherein the direct shading map is based on the lighting direction. Some examples further include encoding, using a residual control encoder, the direct shading map to obtain an encoder output. Some examples further include decoding, using a residual control decoder, the encoder output to obtain a reconstructed shading map. Some examples further include computing a reconstruction loss based on the reconstructed shading map and the direct shading map, wherein the image generation model is updated based on the reconstruction loss.

Figure 10:
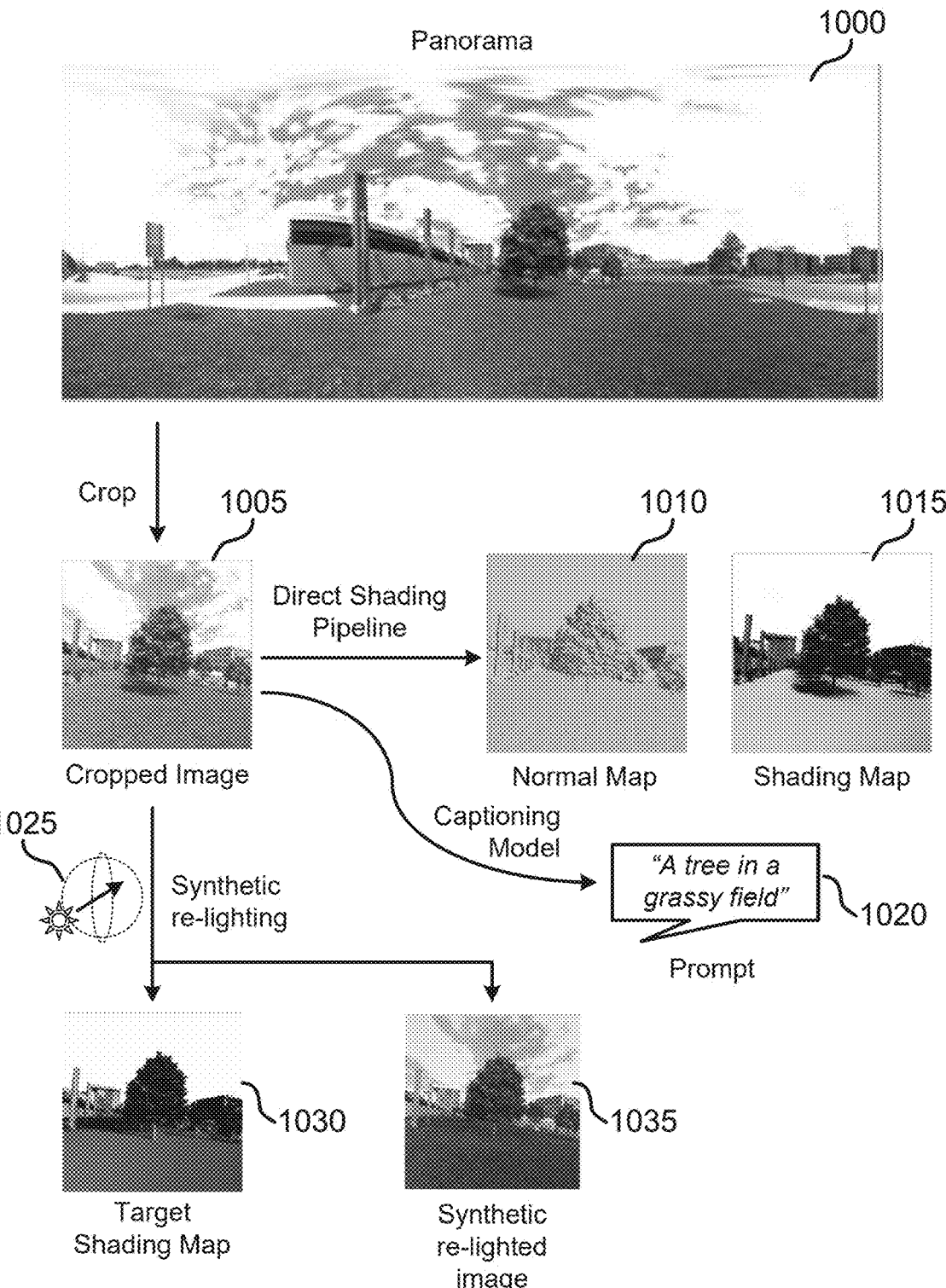
FIG. 10 shows an example of a pipeline for generating training data according to aspects of the present disclosure.

FIG. 10 shows an example of a pipeline for generating training data according to aspects of the present disclosure. The example shown includes input panorama image 1000, cropped input image 1005, normal map 1010, shading map 1015, caption 1020, random lighting direction 1025, target shading map 1030, and re-lighted image 1035. In some cases, the direct shading model is already trained, and is used to aid in the creation of the training data. In this example, the training data is used to train an image generation model including a lighting control network. Within the image generation model, the training process may be used to update parameters of a lighting control network, including a residual control encoder, a residual control decoder, and the control network, while holding parameters of an image generator fixed.

In some cases, the transformations depicted in FIG. 10 are performed by a training component as described with reference to FIG. 2. In the example shown, a re-lighting apparatus receives input panorama image 1000. A training component then crops input panorama image 1000 to produce cropped input image 1005. The cropping operation may be performed randomly, or may be performed according to a segmentation, such as a panoptic segmentation operation.

Then, a direct shading pipeline estimates normal map 1010 and shading map 1015 for cropped input image 1005. A captioning model, such as BLIP-2, is used to create caption 1020. In some aspects, the training component extracts a lighting direction from cropped input image 1005 by identifying the brightest pixel in cropped input image 1005. For the controlled lighting image generation use-case, training data includes the cropped input image 1005, normal map 1010 and shading map 1015, caption 1020, and the extracted lighting direction.

For the re-lighting use-case, additional training data may be generated. For example, a random lighting direction 1025 may be chosen by the training component. A conventional re-lighting model may be used to generate the additional training data, such as re-lighted image 1035. The conventional re-lighting model may include convolutional neural network (CNN)-based feed forward network that is trained on synthetic scenes, such as 3D meshes. Then, the direct shading model is used to extract the target shading map 1030 from re-lighted image 1035.

However, the conventional re-lighting model may generate images with visible artifacts that reduce the plausibility of the resulting re-lighted images. Accordingly, the training component may invert the training data; that is, the generated re-lighted image 1035 and the extracted target shading map 1030 may be used as the initial input to the model, and the cropped input image 1005 may be set as the expected output. The training component may extract the lighting direction from cropped input image 1005 by identifying its target pixel. Accordingly, the image generation model may be instructed to predict the re-lighting of re-lighted image 1035 using re-lighted image 1035, the extracted lighting direction from cropped input image 1005, and the normal map 1010 and shading map 1015 from cropped input image 1005 as input. In this way, the training component teaches the image generation model to generate data similar to real data from input panorama image 1000, rather than data similar to the synthetic data produced by the conventional re-lighting model. In this inversion method, the training component computes an $l_2$ loss based on a comparison between the predicted re-lighted image computed by the image generation model, and the target re-lighted image, i.e., cropped input image 1005. The training component then updates parameters of the lighting control network based on the $l_2$ loss.

Figure 11:
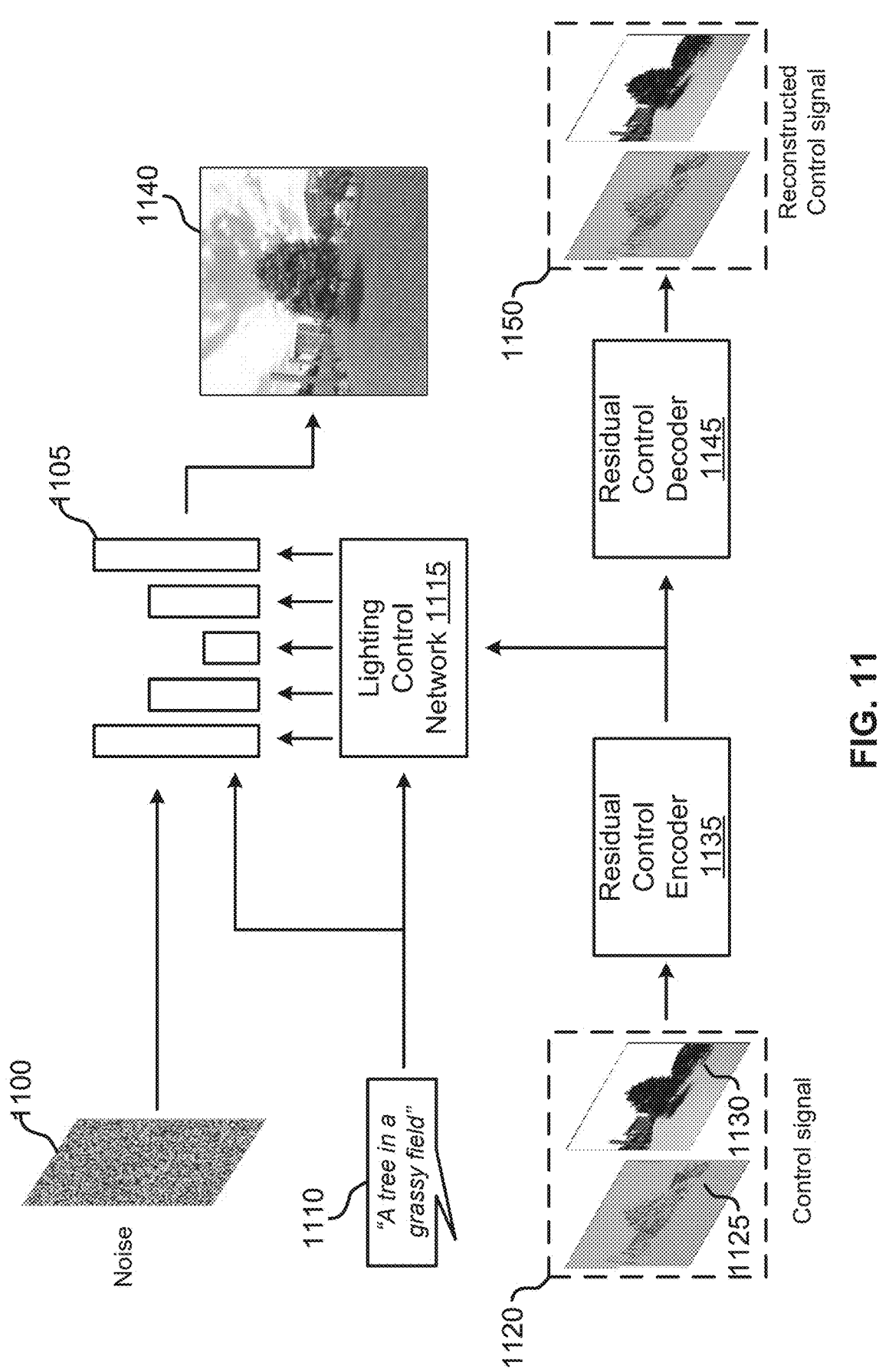
FIG. 11 shows an example of a pipeline for training an image generation model according to aspects of the present disclosure.

FIG. 11 shows an example of a pipeline for training an image generation model according to aspects of the present disclosure. The example shown includes noise 1100, image generator 1105, prompt 1110, lighting control network 1115, control signal 1120, residual control encoder 1135, output image 1140, residual control decoder 1145, and reconstructed control signal 1150.

The image generation network in FIG. 11 is similar to the image generation model illustrated in FIG. 4, except in this training pipeline, the image generation model includes a residual control decoder 1145. Accordingly, redundant description of the repeated components will be omitted.

The residual control decoder 1145 is configured to reconstruct the input to residual control encoder 1135, i.e., control signal 1120. According to some aspects, by training lighting control network 1115 with residual control encoder 1135 and residual control decoder 1145, the lighting control network 1115 learns to generate a control signal that causes image generator 1105 to generate an image that preserves the identity of the input image. For example, without the training process of residual control encoder 1135 and residual control decoder 1145, the images may include similar shape and geometry to the input image when re-shaded, but may have different colors or other features.

According to some aspects, using a baseline ControlNet architecture to produce lighting control information can ignore part of the control signal. In some cases, the control signals tend to be picked up suddenly during training. This can be caused at least in part to the encoder of ControlNet failing to provide a meaningful signal to the control module. Accordingly, embodiments include residual control encoder 1135, which includes residual block architecture with skip connections, and which is supervised during training with an $l_2$ loss based on the residual control decoder 1145 reconstruction of the input control signal, i.e. reconstructed control signal 1150. In some cases, the residual control decoder 1145 is discarded after the training phase.

Figure 12:
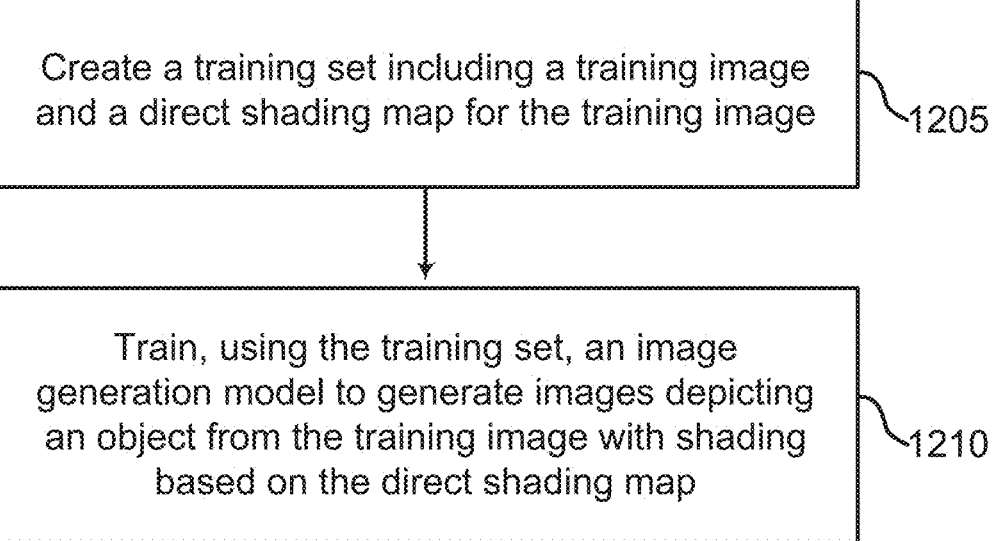
FIG. 12 shows an example of a method for training a machine learning model according to aspects of the present disclosure.

FIG. 12 shows an example of a method 1200 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system creates a training set including a training image and a direct shading map for the training image. In some cases, the operations of this step refer to, or may be performed by, a training component as described with reference to FIG. 2. Additional detail regarding creation of the training set is provided with reference to FIG. 10.

At operation 1210, the system trains, using the training set, an image generation model to generate images depicting an object from the training image with shading based on the direct shading map. In some cases, the operations of this step refer to, or may be performed by, a training component as described with reference to FIG. 2. For example, the system may train the image generation model to predict a shaded image based on an input image and a lighting direction. Additional detail regarding training operations is provided with reference to FIGS. 10-11.

FIG. 13 shows an example of a computing device 1300 according to aspects of the present disclosure. The example shown includes computing device 1300, processor(s), memory subsystem 1310, communication interface 1315, I/O interface 1320, user interface component(s), and channel 1330.

In some embodiments, computing device 1300 is an example of, or includes aspects of, re-lighting apparatus 100 of FIG. 1. In some embodiments, computing device 1300 includes one or more processors 1305 that can execute instructions stored in memory subsystem 1310 to obtain an input image and a lighting direction; generate, using a direct shading model, a direct shading map based on the input image and the lighting direction; and generate, using an image generation model, a shaded image depicting an object from the input image with shading consistent with the lighting direction based on the direct shading map.

According to some aspects, computing device 1300 includes one or more processors 1305. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1310 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1320 or via hardware components controlled by the I/O controller.

According to some aspects, user interface component(s) 1325 enable a user to interact with computing device 1300. In some cases, user interface component(s) 1325 include an audio device, such as an external speaker system, an external display device such as a display screen, an input device (e.g., a remote control device interfaced with a user interface directly or through the I/O controller), or a combination thereof. In some cases, user interface component(s) 1325 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining an input image and a lighting direction indicator that describes a lighting direction;
generating, using a direct shading model, a direct shading map based on the input image and the lighting direction indicator; and
generating, using an image generation model, a shaded image depicting an object from the input image with shading consistent with the lighting direction based on the direct shading map, wherein generating the shaded image comprises performing a reverse diffusion process using the direct shading map as a control guidance.

2. The method of claim 1, wherein generating the direct shading map comprises:
encoding the input image to obtain image features; and
projecting the image features in a depth dimension to obtain a three dimensional (3D) feature grid, wherein the direct shading map is based on the 3D feature grid.

3. The method of claim 2, further comprising:
generating a depth map based on the input image, wherein the 3D feature grid is based on the depth map.

4. The method of claim 2, further comprising:
generating a density grid based on the 3D feature grid.

5. The method of claim 4, further comprising:
generating a shading input based on the density grid, wherein the shading input includes a shadow map, a normal map, an N-dot-L map, or any combination thereof, and wherein the direct shading map is generated based on the shading input.

6. The method of claim 4, further comprising:
generating a coarse shading map based on the density grid; and
refining the coarse shading map based on the input image to obtain the direct shading map.

7. The method of claim 1, wherein generating the shaded image comprises:
encoding, using a residual control encoder, the direct shading map to obtain lighting control information, wherein the shaded image is generated based on the lighting control information.

8. The method of claim 7, wherein generating the shaded image comprises:
obtaining a normal map, wherein the lighting control information is generated based on the normal map.

9. The method of claim 7, wherein:
the residual control encoder is trained based on an output of a residual control decoder that reconstructs an input of the residual control encoder.

10. The method of claim 1, wherein:
the image generation model is trained to generate images depicting an element of a training image with shading based on a training direct shading map.

11. A method for training a machine learning model, comprising:
obtaining a training set including a training image and a direct shading map for the training image;

encoding, using a residual control encoder, the direct shading map to obtain an encoder output;
decoding, using a residual control decoder, the encoder output to obtain a reconstructed shading map; and
training, using the training set, an image generation model to generate images depicting an object from the training image with shading based on the direct shading map, wherein the image generation model is separate from the residual control encoder and the residual control decoder.

12. The method of claim 11, wherein obtaining the training set comprises:
generating, using a direct shading model, the direct shading map based on the training image.

13. The method of claim 12, further comprising:
training the direct shading model to generate the direct shading map based on the training image.

14. The method of claim 12, further comprising:
extracting a lighting direction from the training image, wherein the direct shading map is based on the lighting direction.

15. The method of claim 11, wherein training the image generation model comprises:
computing a reconstruction loss based on the reconstructed shading map and the direct shading map, wherein the image generation model is updated based on the reconstruction loss.

16. An apparatus comprising:
at least one processor;
at least one memory storing instructions executable by the at least one processor;
a direct shading model comprising parameters stored in the at least one memory, wherein the direct shading model is configured to generate a direct shading map based on an input image and a lighting direction indicator that describes a lighting direction; and
an image generation model comprising parameters stored in the at least one memory, wherein the image generation model is configured to generate a shaded image depicting an object from the input image with shading consistent with the lighting direction based on the direct shading map by performing a reverse diffusion process using the direct shading map as control guidance.

17. The apparatus of claim 16, wherein:
the image generation model comprises a residual control encoder trained to generate lighting control information for an image generator.

18. The apparatus of claim 16, wherein:
the direct shading model comprises a density network trained to generate a density grid based on 3D features of the input image.

19. The apparatus of claim 18, wherein:
the direct shading model comprises a shading network trained to generate the direct shading map based on the density grid.

* * * * *